United States Patent [19]

Kaim

[11] Patent Number: 5,165,714
[45] Date of Patent: Nov. 24, 1992

[54] TRACTOR FIFTH WHEEL WITH BEARING PLATE LUBRICATING LINER

[75] Inventor: John W. Kaim, Chicago, Ill.

[73] Assignee: Amsted Industries Incorporated, Chicago, Ill.

[21] Appl. No.: 666,781

[22] Filed: Mar. 8, 1991

[51] Int. Cl.[5] ............................................ B62D 53/06
[52] U.S. Cl. .................. 280/433; 280/441.1; 384/421
[58] Field of Search ............... 280/433, 438.1, 441.1; 384/421

[56] References Cited

U.S. PATENT DOCUMENTS

| | | | |
|---|---|---|---|
| 3,337,277 | 8/1967 | Arnold | 384/421 |
| 3,704,924 | 12/1972 | Lowry | 384/421 |
| 3,924,909 | 12/1975 | Kent et al. | 384/421 |
| 4,169,635 | 10/1979 | Szalay et al. | 384/421 |
| 4,542,912 | 9/1985 | St. Louis | 280/433 |
| 4,752,081 | 6/1988 | Reeners et al. | 280/433 |
| 4,805,926 | 2/1989 | Mamery | 280/433 |
| 5,066,035 | 11/1991 | Athans et al. | 280/433 X |

FOREIGN PATENT DOCUMENTS

| | | | |
|---|---|---|---|
| 1264482 | 1/1990 | Canada. | |
| 3612832 | 10/1987 | Fed. Rep. of Germany | 280/433 |
| 3741330 | 6/1989 | Fed. Rep. of Germany | 280/433 |
| 674635 | 6/1990 | Switzerland | 280/433 |

Primary Examiner—Charles A. Marmor
Assistant Examiner—Kevin Harley
Attorney, Agent, or Firm—Edward J. Brosius; F. S. Gregorczyk

[57] ABSTRACT

A fifth wheel assembly for tractors or other draft arrangement has a bearing plate with a lubricating plate, a peripheral wall with diametrically opposed notches extending above the bearing plate surface and a nonmetallic lubricating wear liner with diametrically opposed ears notchable with the notches to resist rotational motion by the liner, which liner extends above the peripheral wall and is secured against the bearing plate as a lubricating liner but retained within the bearing plate cavity against radially outward displacement by the peripheral wall.

9 Claims, 4 Drawing Sheets

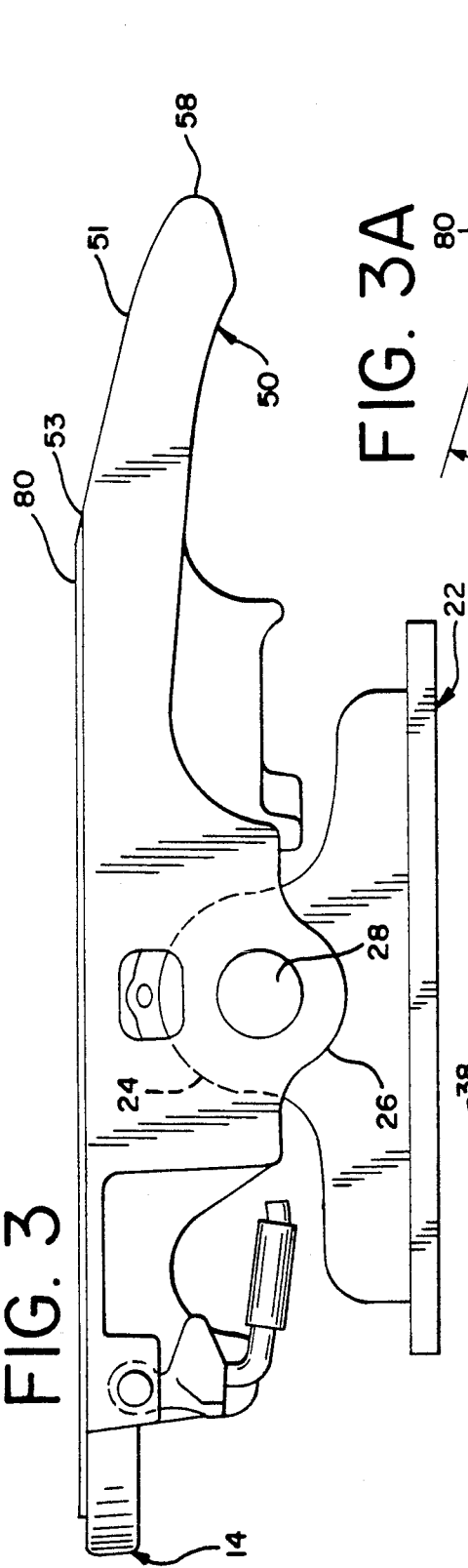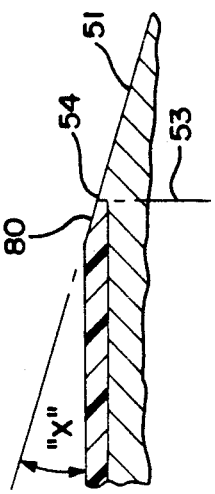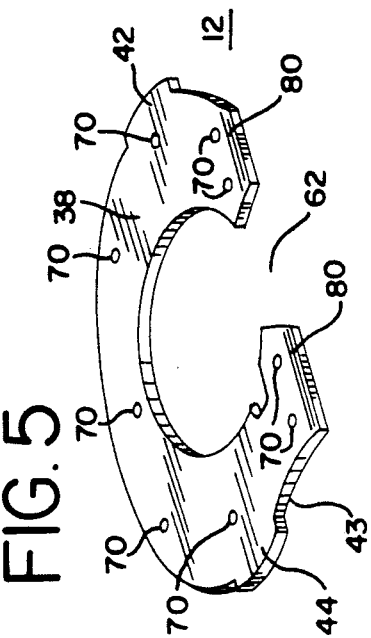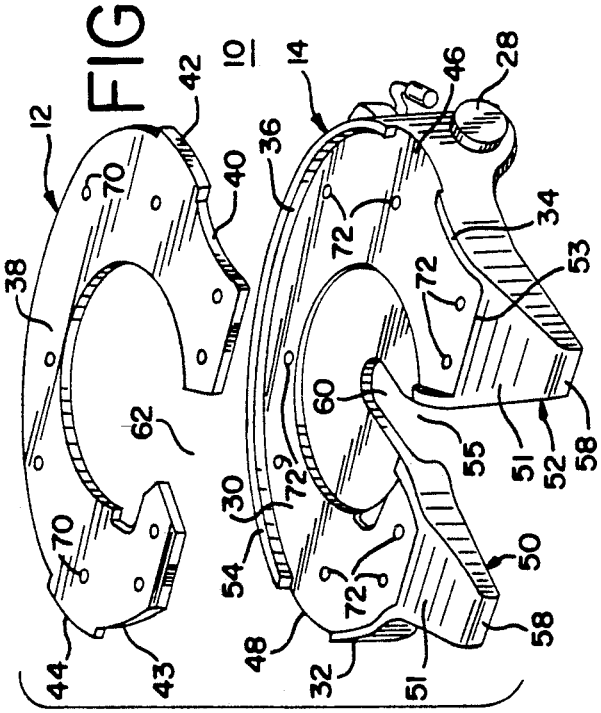

TRACTOR FIFTH WHEEL WITH BEARING PLATE LUBRICATING LINER

BACKGROUND OF THE INVENTION

The present invention broadly relates to coupling devices for connecting a tractor with at least one trailer in a tracking position for transport of bulky or heavy loads. More specifically a fifth wheel coupling apparatus has a lubricating plate, which is securely retained against rotation by interactive surfaces and against radially outward displacement by compressive or transverse loads.

The trucking industry utilizes motorized transport vehicles for hauling freight, which vehicles or truck rigs frequently are a motorized tractor with one or more trailers in a tracking position behind it. As with most capital equipment, optimal economic benefit from the tractor and trailer is realized by maximum or continuous usage of the equipment. However, truck rig equipment requires substantial maintenance to sustain its operating condition.

Fifth wheels couple and uncouple a trailer from a tractor. Fifth wheel assemblies have a bearing plate surface and a central pocket for mating with a draft member or king pin extending from a trailer bearing plate. The king pin nests in the pocket or draft connection and is retained in the pocket to maintain the trailer in the tracking position. The tractor and trailer bearing plate surfaces react against each other during tractor and trailer coupling especially during travel along a roadway.

The bearing plate interface, or more specifically the respective bearing plate surfaces, are susceptible to abrasion from metal-to-metal contact. Rubbing contact is induced by longitudinal and transverse loads at the interface, but is further aggravated by a lateral twisting motion from cornering and rig motion as the rig traverses the road. The lateral twisting motion or pitch may induce wear from intermittent loading at diametrically opposed, bearing plate circumference positions above the fifth wheel mounting brackets. A lubricant, which has generally been a viscous grease, is usually applied between the fifth wheel and trailer bearing plate surfaces to reduce frictional wear. However, the grease layer on the fifth wheel plate surface captures particulate matter, which may act as an abrasive, causing more rapid wear and abrasion, and thus a higher repair and replacement rate of the tractor and trailer bearing plates.

As noted, maximum economic benefit of a tractor and trailer rig is derived by nearly continuous utilization of this equipment. However, continuous use of the rig requires an active maintenance program to sustain the rig in operating condition. This maintenance program includes removing the grease layer on the fifth wheel bearing surface along with the entrained grit and particulates. The frequency of maintenance in the trucking industry has not generally been adequate to minimize the effect of the abrasive materials captured between the respective tractor and trailer bearing plates, which results in lower useful life for these plates as well as more frequent repair or replacement Cleaning the fifth wheel top bearing plates of the grease and particulate matter is usually accomplished by high-pressure steam or application of organic solvents. This flushes the grease into a sewer system and discharge into a waterway, or onto the ground where it is considered an undesirable environmental element as it may leach into and contaminate an aquifer. The necessity or benefit of a lubricating barrier between the opposed bearing plates is so readily apparent that manufacturers provide automatic greasing systems and grease grooves in the tractor bearing plate in an attempt to maintain at least a minimum grease barrier at this interface. However, providing a fresh grease layer or grease addition without purging the extant contaminated grease is not adequate to provide the requisite lubrication for bearing plates.

The desire to overcome or replace the use of grease on the bearing plates has been encouraged by a requirement from the EPA and its affiliated regulatory agencies for the handling and disposal of such materials. Consequently, the trucking industry is continually seeking environmentally acceptable means to overcome wear, erosion, and abrasion between the bearing plates while continuing to provide an adequate lubricant barrier between these abrasive and frictionally engaged surfaces. The acceptable lubricant barrier must accommodate the longitudinal, transverse and pitching motions of the trailer and tractor during transport. Earlier efforts to overcome the utilization of a grease barrier or lubricant between the opposed and contacting bearing plates incorporated a liner or liner layer of low friction material positioned on the fifth wheel or trailer bearing plate to obviate the requirement for thoroughly greasing the surfaces of the bearing plates. These earlier low frictional materials between opposed bearing plates were generally soft, easily damaged or scuffed and consequently, have an inherently short useful life span. In addition, the soft material liners were susceptible to lateral or radial displacement at the bearing plate perimeter; and, they were subject to displacement by the rotational forces applied between the tractor and trailer bearing plates, as well as by a longitudinal force of the trailer during coupling.

SUMMARY OF THE INVENTION

The present invention provides a fifth wheel assembly, which is usually utilized for coupling a tractor and trailer arrangement, with a molded lubricating liner or barrier secured on its upper or bearing plate surface, which liner protrudes above the upper bearing plate surface to contact the trailer bearing plate lower surface. Although the molded lubricating liner is generally annular to provide maximum loading at the fifth wheel circumference, the liner may also substantially cover the entire fifth wheel bearing plate.

A collar at the fifth wheel bearing plate circumference forms a recess at the bearing plate surface for the molded lubricant liner and retains it in position on the bearing plate against outwardly radial forces acting on the lubricant liner. Notches or slots in the collar at diametrically opposed locations, which notches are preferably above the mounting brackets, receive radially outward extending lubricant liner ears or segments. The nested liner ears inhibit rotational movement of the liner during rig turning or other relative rotation between the opposed tractor and trailer bearing plates.

A tapered edge on the lubricant liner is provided at its intersecting edge with the flared, sloped and rearwardly extending ramps of the fifth wheel to accommodate smoother engagement between the opposed bearing plates at mating of the tractor and trailer.

BRIEF DESCRIPTION OF THE DRAWINGS

In the figures of the drawing, like reference numerals identify like components and in the drawings:

FIG. 3 is a side elevational view of the fifth wheel in FIG. 1;

FIG. 3A is an enlarged view of the intersection of the sloping ramp and liner edge of FIG. 3;

FIG. 4 is an exploded view in perspective of the wear liner and fifth wheel upper surface;

FIG. 5 is a perspective view of the wear liner in FIG. 1;

DETAILED DESCRIPTION OF THE PREFERRED EMBODIMENT

Figure 1:
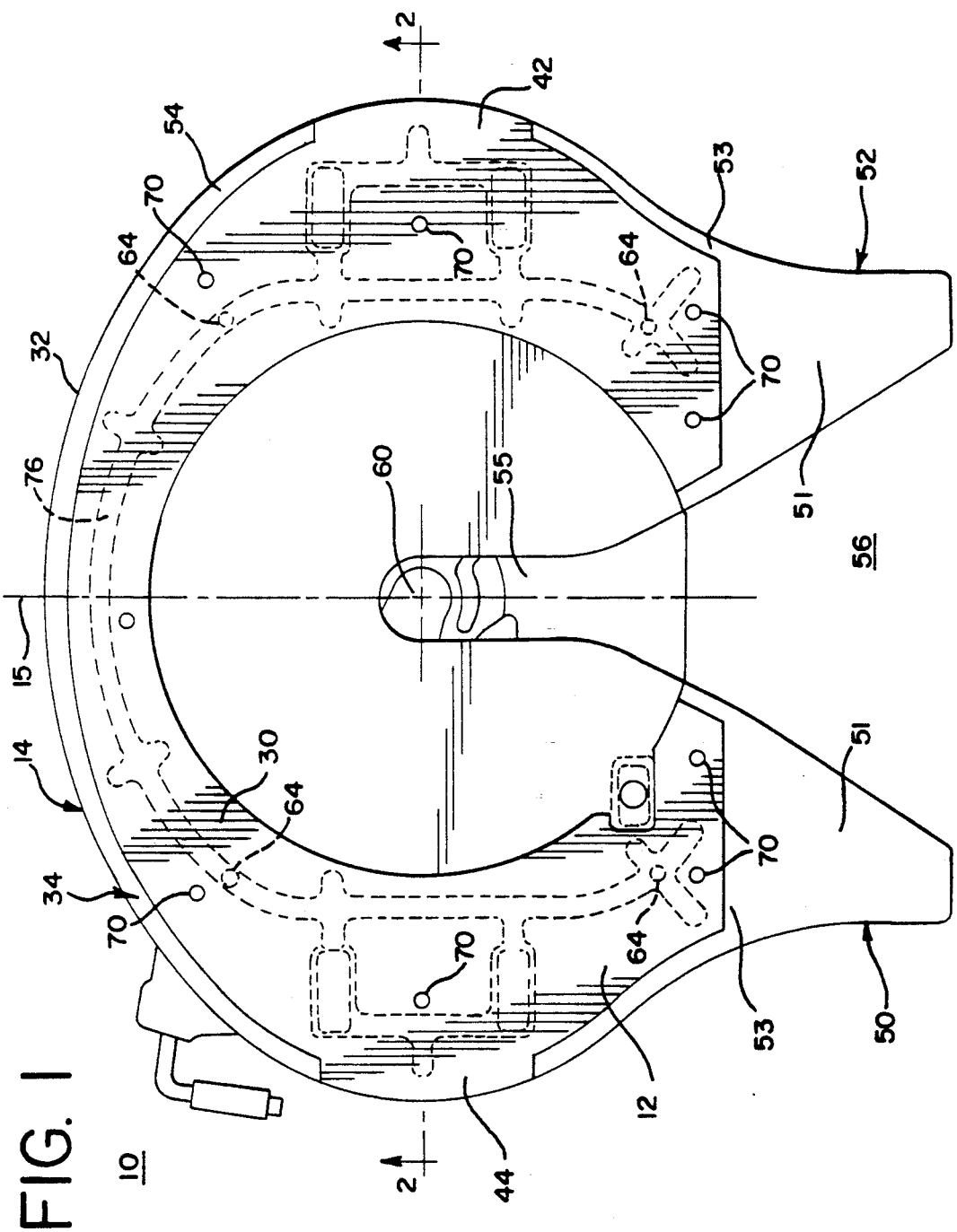
FIG. 1 is a plan view of a fifth wheel and wear liner.
Figure 2:
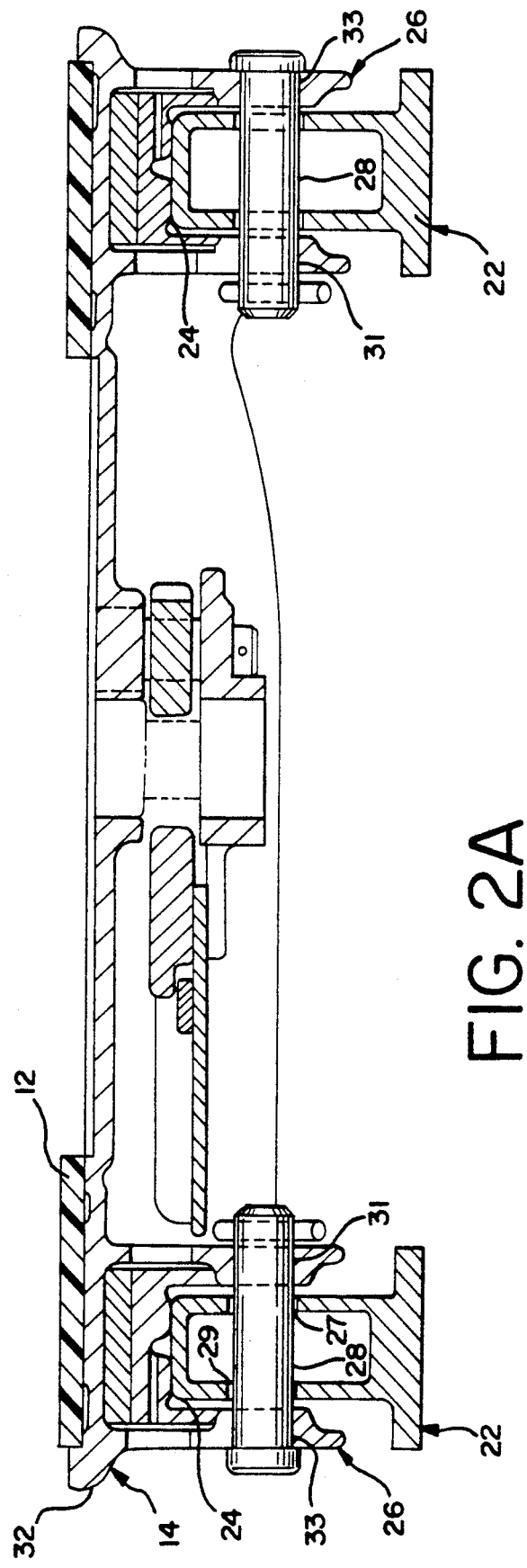
FIG. 2 is an elevational view of the fifth wheel of FIG. 1 taken along the line 2—2.
Figure 2A:
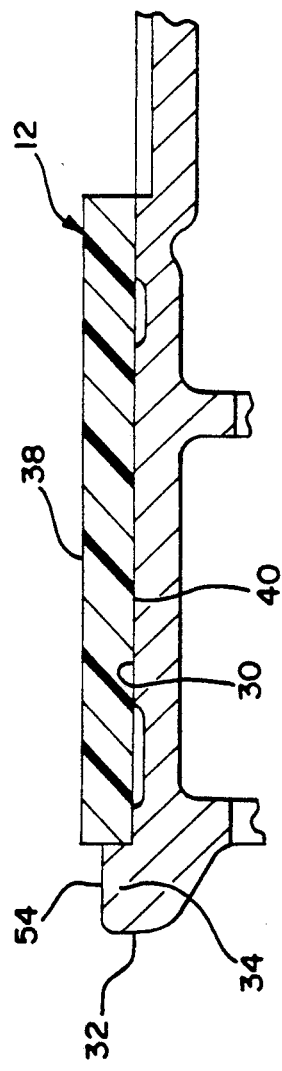
FIG. 2A is an enlarged view of the wear liner and fifth wheel cavity at one edge.
Figure 9:
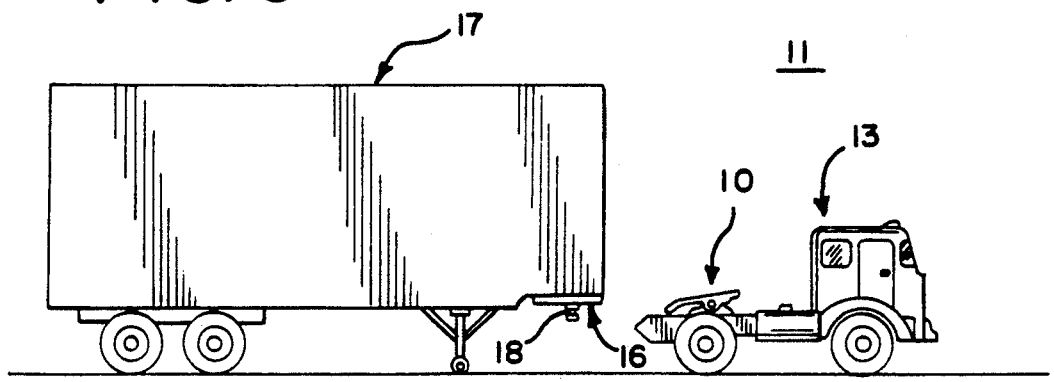
FIG. 9 illustrated an elevational view of an exemplary tractor trailer rig.

The present invention in FIG. 1 broadly relates to fifth wheel assembly 10 for tractors, which fifth wheel assemblies 10 couple tractor and trailer rigs for tracking along a roadway. An exemplary tractor and trailer arrangement is illustrated in FIG. 9 with tractor 13 having fifth wheel 10 mounted thereon and trailer bearing plate 16 secured to trailer 17 at its forward location.

Figure 8:
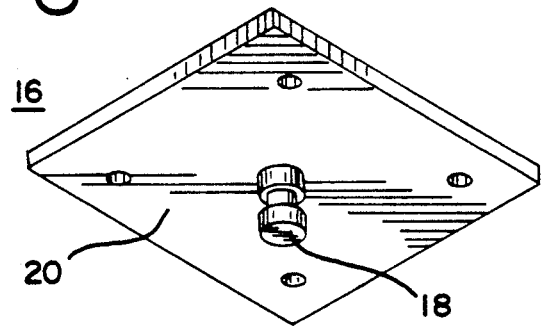
FIG. 8 is a perspective plan view of a trailer bearing plate and king pin.

Fifth wheel 10 has longitudinal axis 15 and draft port 60, and as shown in FIG. 1 is usually mounted above the rear axle or axles of tractor 13 for receipt and mating of draft port 60 and a trailer draft member, such as king pin 18, extending from lower surface 20 of trailer bearing plate 16 in FIG. 8. A mated tractor and trailer arrangement is frequently operated as a unit for the transport of heavy or bulky loads along a roadway. Although the preferred embodiment is illustrated on a tractor 13, fifth wheel 10 is adaptable for utilization on dollies for coupling multiple trailers. In FIG. 3, fifth wheel 10 is mountable on tractor 13 by brackets 22, which are pivotally mated in fifth wheel clevises or flanges 26 downwardly extending from lower surface 24 at diametrically opposed locations of fifth wheel perimeter 32. Brackets 22 and flanges 26 are pivotably secured by crosspins 28 extending through aligned bracket apertures 27, 29 and fifth wheel flange ports 31, 33.

Fifth wheel bearing plate 14, as noted in FIGS. 1 and 4, has a generally circular or ovate shape and upper surface 30 with perimeter 32, and sidewall or collar 34 extends above surface 30 at perimeter 32 to provide a recess or cavity 36 for wear liner 12. Upper lip or edge 54 of collar 34 extends above surface 30 a predetermined distance, which height or distance is less than the thickness of wear liner 12 to allow liner upper surface 38 to contact trailer bearing plate lower surface 20 without contacting colar 34. Further, the height or thickness of collar 34 may be any height desired by the designer or user.

Bearing plate wear can result from frictional contact between two hard unlubricated surfaces, that is rubbing contact between tractor bearing plate surface 30 and trailer bearing plate lower surface 20. A traditional approach to lubricating the bearing plate surfaces is shown in FIG. 1 where grease fitting bores 64 are in grease track 76, which is a groove in plate surface 30 for feeding and retaining grease through fittings (not shown), as known in many extant fifth wheels. Wear liner 12, which is preferably a resilient nonmetallic material having low or antifriction properties and good wear characteristics, such as ultrahigh molecular weight polyethylene, is mounted on upper surface 30 of fifth wheel base or bearing plate 14. Wear liner 12 is interposed between mated base plate 14 and lower surface 20 of trailer bearing plate 16, and is operable as a lubricating barrier to inhibit or prohibit wear, abrasion and erosion. Wear liner 12 in recess 36 has its lower surface 40 in contact with bearing plate upper surface 30, and may be secured in recess 36 on surface 30 by bolts or screws 35.

Figure 6:
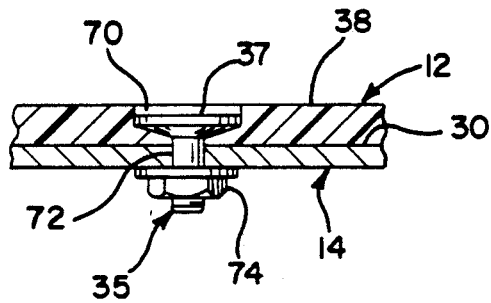
FIG. 6 illustrates an anchoring means for securing the wear liner to the fifth wheel.
Figure 7:
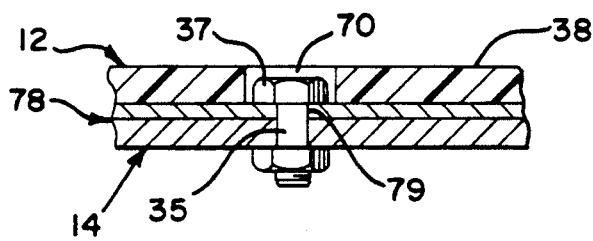
FIG. 7 is an alternative means to anchor the wear liner and fifth wheel upper surface.

As illustrated in FIG. 6, bolts 35 with heads 37 extend through liner passage 70 and bearing plate port 72 to mate with nut 74 and anchor liner 12 to plate 14. Passage 70 in FIG. 6 is countersunk to provide clearance for bolthead 37 below liner upper surface 38, which avoids direct and wearing contact between bolts 35 and lower surface 20 of trailer bearing plate 16. Bearing plate ports 72 would preferably be located in areas which do not compromise the structural integriity and strength of fifth wheel 10. In an exemplary illustration, a potential configuration of passages 70 in liner 12 is shown in FIGS. 4 and 5. In an alternative securing arrangement in FIG. 7, liner 12 is bonded to mounting plate 78, such as by adhesives, and bolt 35 extends through mounting plate passage 79 to secure liner 12 and mounting plate 78 on fifth wheel 10. Further, bolts 35 may be screws for mating engagement with drilled and tapped passages in plate 14.

Wear liner 12, which is generally annular in the illustrated embodiment, has extending first and second ears 42, 44 approximately diametrically opposed and extending from liner outer perimeter 43. Extending ears or protuberances 42, 44 nest into slots 46 and 48, respectively, of fifth wheel sidewall 34 at insertion of the wear liner 12 into recess 36. Ears 42, 44 in slots 46, 48, which ears and slots may be a short arcuate length such as 2 to 8 inches, inhibit liner 12 movement during relative rotation between lower surface 20 of trailer bearing plate 16 and liner upper surface 38. Thus, wear liner 12 is secured in recess 36 against longitudinal motion along axis 15 or rotation in recess 36, and constrained against lateral or radial displacement by sidewall 34. As noted in FIG. 4, wear liner 12 is relatively thin, such as about one-quarter (¼) inch, but thick enough to provide upper surface 38 above upper edge or lip 54 of sidewall 34 after mating of fifth wheel 10 and trailer bearing plate 16.

In the preferred embodiment, wear liner 12 is tapered to smoothly intersect with sloped ramps 50, 52 at fifth wheel rear edge 53. Fifth wheel bearing plate 14 has first and second tail ramps 50 and 52, which slope both downward and rearward from collar upper surface 54 at fifth wheel rear edge 53. Surfaces 51 of rearwardly sloping ramps 50, 52 each provide an initial contact point for lower surface 20 of trailer bearing plate 16 and an inclined surface to ease the mating of the trailer and tractor assemblies. Ramps 50, 52 form V-shaped gap 56 in fifth wheel 10, which gap 56 extends from outer ramp edges 58 into bearing plate slot 55 and generally centered, fifth wheel draft port 60. Wear liner 12 has slit or cut 62, which is similarly shaped to slot 55 to provide clearance access at slot 56 and draft port 60 for king pin 18 at mating engagement of tractor and trailer bearing plates 14, 16.

In FIGS. 3 and 3A, a tapered surface 80 on liner 12 extends from liner surface 38 at an angle 'X', which angle 'X' provides a relatively continuous surface with ramp surfaces 51 for a smoother sliding merger and mating of fifth wheel and trailer bearing plates 14, 16. The continuum of these sloped surfaces allows the mating of trailer 17 and tractor 13 without a discontinuity at the intersection of these surfaces, and avoids an abrupt, exposed edge subject to interference from the sliding trailer bearing plate lower surface 20.

In operation, wear liner 12 is mounted and secured in recess 36 by bolts 35 and ears 42, 44 are nested in slots 46, 48, respectively, to anchor wear liner 12 against rotational motion during normal travel of trailer 17 and tractor 13. Wear liner 12 is slightly greater in height or thickness than sidewall 34 and protrudes above sidewall upper lip 54 to provide a wear or contact surface for lower surface 20 of trailer bearing plate 16, and inhibits contact between sidewall upper lip 54 and lower surface 20 to avoid abrasion and erosion on either of these surfaces.

Trailers 17 are known to laterally tilt during transport on the highway. This tilt would put lateral stresses on the interface between lower surface 20 of trailer bearing plate 16 and fifth wheel bearing plate upper surface 30. Consequently, wear liner 12 is subjected to lateral or transverse strain and displacement from its position on upper bearing plate surface 30 during normal usage. However, side wall 34 maintains wear liner 12 in position on bearing upper surface 30, which liner 12 is thus operable to maintain the trailer against tilt and reduce the stress and strain upon the tractor.

Prior to mating of tractor 13 and trailer 17, fifth wheel 10 is frequently downwardly inclined by pivoting on pins 28 to provide ramps 50, 52 at an exaggerated downward inclination from its usual horizontal mated position. Ramps 50, 52 slope upward or are inclined forward from ramp rear edges 58. In the preferred embodiment, rear surfaces 80 of wear liner 12 at fifth wheel rear edge 53, which is in proximity to ramps 50, 52, are tapered to provide a continuum of the ramped surfaces 51 for smoother mating engagement with trailer bearing plate lower surface 20 and king pin 18 without abrasive or aggressive contact with liner 12 to inhibit its tearing or displacement.

While only specific embodiments of the invention have been described and shown, it is apparent that various alterations and modifications can be made therein. It is, therefore, the intention in the appended claims to cover all such modifications and alterations as may filed in the scope and spirit of the invention.

I claim:

1. A fifth wheel assembly for a tractor, which assembly is matable with a trailer bearing plate assembly, said fifth wheel assembly comprising:
    a bearing plate having a periphery with a rearward edge, an upper surface and a lower surface,
    a generally centrally located draft connection, and a passageway communicating from said periphery to said draft connection;
    a longitudinal axis generally aligned with said passageway and gap;
    a first sloped flange and a second sloped flange generally extending from said bearing plate periphery at said rearward edge, said first and second flanges cooperating to define a gap communicating to said passage and draft connection;
    a nonmetallic wear liner positionable on said bearing plate upper surface to provide a lubricating contact for a trailer bearing plate;
    a sidewall at said bearing plate periphery,
    said sidewall having at least a first notch and a second notch, which first and second notches are generally diametrically opposed and on opposite sides of said longitudinal axis,
    said sidewall about normal to said bearing plate upper surface, which sidewall and upper surface cooperate to define a recess for said wear liner, said sidewall operable to retain said liner in said recess against lateral and radial displacement forces;
    said wear liner having an outer edge in proximity to said sidewall, at least a first radially outward protruding ear and a second radially outward protruding ear,
    each of said ears nestable in a notch to retain said wear liner against rotation on said bearing surface and to provide side support against trailer side tilt.

2. A fifth wheel assembly as claimed in claim 1 wherein each of said fifth wheel first and second sloped flanges has a ramp surface; said side wall having an upper edge; said wear liner having a top surface extending above said peripheral side wall upper edge, which wear liner is radially outwardly and downwardly tapered from said top surface at said rearward edge to provide an approximately continuous ramp-like junction with each of said ramp surfaces for ease of fifth wheel and trailer-bearing plate mating and, to inhibit wear liner tearing and displacement at said mating.

3. A fifth wheel assembly as claimed in claim 1 further comprising means for securing said wear liner in said bearing plate recess on said bearing plate surface.

4. A fifth wheel assembly claimed in claim 3 wherein said securing means is an adhesive.

5. A fifth wheel assembly as claimed in claim 3 wherein said fifth wheel bearing plate defines a plurality of securing ports, said wear liner defining a plurality of passages alignable with said securing ports; and,
    said securing means extending through said passages and ports to secure said wear liner to said fifth wheel bearing plate.

6. A fifth wheel assembly as claimed in claim 5 wherein said securing ports are through bores in said bearing plate and said securing means is a plurality of bolts and nuts, which one of said bolts for and extending through each of passages and bores to mate with a nut and secure said wear liner in said recess.

7. A fifth wheel assembly as claimed in claim 5 wherein each of said securing ports has a threaded sidewall, said securing means is a plurality of threaded screws, one of said screws extending through each of said liner passages to mate with a threaded port sidewall to secure said liner in said recess.

8. A fifth wheel assembly as claimed in claim 3 further comprising a mounting plate, said wear liner bonded on said mounting plate, said means for securing extending through and securing said wear liner and mounting plate to said fifth wheel bearing plate.

9. A fifth wheel assembly for a tractor, which assembly is matable with a trailer bearing plate assembly, said fifth wheel assembly comprising:
    a bearing plate having a periphery with a rearward edge, an upper surface and a lower surface, a generally centrally located draft connection, and a passageway communicating from said periphery to said draft connection;

a longitudinal axis generally aligned with said passageway and gap;

a first sloped flange and a second sloped flange generally extending from said bearing plate periphery at said rearward edge, said first and second flanges cooperating to define a gap communicating to said passage and draft connection;

a nonmetallic wear liner positionable on said bearing plate upper surface to provide a lubricating contact for a trailer bearing plate;

a sidewall at said bearing plate periphery, said sidewall having a first notch and a second notch, which first and second notches are generally diametrically opposed and about transverse to said longitudinal axis, said sidewall about normal to said bearing plate upper surface, which sidewall and upper surface cooperate to define a recess for said wear liner, said sidewall operable to retain said liner in said recess against lateral and radial displacement forces;

said wear liner having an outer edge in proximity to said sidewall, a first protruding ear and a second protruding ear, each said first and second ear extending radially outward from said outer edge, said first and second ears matable with said first and second notches, respectively, to retain said wear liner against rotation on said bearing surface and to provide side support against trailer side tilt.

* * * * *